US009009556B2

(12) United States Patent
Resnick

(10) Patent No.: US 9,009,556 B2
(45) Date of Patent: *Apr. 14, 2015

(54) ERROR CORRECTION AND RECOVERY IN CHAINED MEMORY ARCHITECTURES

(71) Applicant: Micron Technology, Inc., Boise, ID (US)

(72) Inventor: David R. Resnick, Boise, ID (US)

(73) Assignee: Micron & Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,637

(22) Filed: Feb. 26, 2014

(65) Prior Publication Data

US 2014/0181574 A1 Jun. 26, 2014

Related U.S. Application Data

(60) Continuation of application No. 13/757,432, filed on Feb. 1, 2013, now Pat. No. 8,667,358, which is a division of application No. 12/707,421, filed on Feb. 17, 2010, now Pat. No. 8,381,059.

(51) Int. Cl.
| | |
|---|---|
| G08C 25/02 | (2006.01) |
| H04L 1/18 | (2006.01) |
| G06F 11/20 | (2006.01) |
| G06F 11/10 | (2006.01) |
| G06F 11/07 | (2006.01) |
| G06F 12/14 | (2006.01) |

(52) U.S. Cl.
CPC ........ *G06F 11/2053* (2013.01); *G06F 11/1004* (2013.01); *G06F 11/1008* (2013.01); *G06F 11/1088* (2013.01); *G06F 11/2094* (2013.01); *G06F 11/0727* (2013.01); *G06F 12/14* (2013.01)

(58) Field of Classification Search
CPC ............ G06F 11/1004; G06F 11/1008; G06F 11/1088; G06F 12/14; G06F 11/0727; G06F 11/2053; G06F 11/2094
See application file for complete search history.

(56) References Cited

U.S. PATENT DOCUMENTS

| | | | | | |
|---|---|---|---|---|---|
| 5,502,733 | A | * | 3/1996 | Kishi et al. ................... | 714/748 |
| 5,619,614 | A | * | 4/1997 | Payne et al. ....................... | 706/1 |
| 6,092,173 | A | * | 7/2000 | Sasaki et al. .................... | 712/14 |
| 7,310,748 | B2 | * | 12/2007 | Jeddeloh ......................... | 714/42 |
| RE39,989 | E | * | 1/2008 | Morris ........................ | 455/426.1 |
| 7,823,024 | B2 | * | 10/2010 | Jeddeloh ......................... | 714/42 |
| 7,836,378 | B2 | * | 11/2010 | Shaeffer et al. ................ | 714/763 |
| 7,954,017 | B2 | * | 5/2011 | Kashyap et al. .............. | 714/718 |
| 8,108,744 | B2 | * | 1/2012 | Dubey et al. .................. | 714/733 |
| 8,135,999 | B2 | * | 3/2012 | Morrow et al. ................ | 714/716 |
| 8,140,936 | B2 | * | 3/2012 | Gower et al. .................. | 714/758 |
| 8,381,059 | B2 | * | 2/2013 | Resnick ......................... | 714/748 |
| 8,667,358 | B2 | * | 3/2014 | Resnick ......................... | 714/748 |
| 2005/0265383 | A1 | * | 12/2005 | Melpignano et al. ......... | 370/465 |
| 2005/0283681 | A1 | * | 12/2005 | Jeddeloh ......................... | 714/42 |
| 2008/0126624 | A1 | | 5/2008 | Prete et al. | |
| 2008/0126892 | A1 | * | 5/2008 | Dubey et al. .................. | 714/718 |

(Continued)

*Primary Examiner* — Guerrier Merant
(74) *Attorney, Agent, or Firm* — Schwegman Lundberg & Woessner, P.A.

(57) ABSTRACT

Electronic apparatus, systems, and methods to construct and operate the electronic apparatus and/or systems include a memory unit configured to receive data flow from two directions. The memory unit can be configured serially in a chain with other memory units. The chain can include an error check and correcting unit (ECC). Additional apparatus, systems, and methods are disclosed.

26 Claims, 6 Drawing Sheets

(56) References Cited

U.S. PATENT DOCUMENTS

| | | | |
|---|---|---|---|
| 2008/0163007 A1* | 7/2008 | Shaeffer et al. | 714/52 |
| 2010/0313067 A1 | 12/2010 | Resnick | |
| 2011/0131370 A1* | 6/2011 | Vogt et al. | 711/105 |
| 2011/0202813 A1 | 8/2011 | Resnick | |
| 2012/0102256 A1* | 4/2012 | Vogt et al. | 710/313 |
| 2013/0145207 A1 | 6/2013 | Resnick | |

* cited by examiner

ERROR CORRECTION AND RECOVERY IN CHAINED MEMORY ARCHITECTURES

PRIORITY APPLICATIONS

This application is a continuation of U.S. application Ser. No. 13/757,432, filed Feb. 1, 2013, now issued as U.S. Pat. No. 8,667,358, which is a divisional of U.S. application Ser. No. 12/707,421, filed Feb. 17, 2010, now issued as U.S. Pat. No. 8,381,059, all of which are incorporated herein by reference in their entirety.

BACKGROUND

A number of configurations in computer memory exist to protect data against errors or failure of memory devices. Detection/correction schemes, such as the Chipkill™ memory architecture, exist to protect computer memory systems from single memory chip failure as well as multi-bit errors from any portion of a single memory chip. In the Chipkill™ architecture, bits of multiple words of error correcting code data are scattered across multiple memory chips, such that the failure of any one memory chip will affect each value of the error correcting code data resembling multiple correctable errors. This configuration allows memory contents to be reconstructed despite the complete failure of one chip.

In computer hard drive memory, redundant arrays of inexpensive disks (RAID) configurations allow backup of data when multiple drives are configured in parallel, where n+1 drives are used to store data. The extra memory of the "1" drive of n+1 in a RAID 4 or RAID 5 configuration is used to store the error correcting code data. However, RAID configurations are often relatively slow to implement write operations because each write requires updating the error correcting code data, such that two writes are required for every operation (one for the data being written, and another for the updated error correcting code data being written). Thus, performance of a RAID 5 configuration when writing is approximately one half the reading performance. RAID data recovery operations can even be slower than half the speed of read operations, because all disks must be read individually to perform error recovery.

BRIEF DESCRIPTION OF THE DRAWINGS

Embodiments of the invention are illustrated by way of example and not limitation in the figures of the accompanying drawings in which.

DETAILED DESCRIPTION

The following detailed description refers to the accompanying drawings that show, by way of illustration, various embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, memory configurations with error recovery capability are configured to reduce the amount of memory needed to store error recovery information, such as error correcting code data. Architectures for such memory configurations with error recovery capability improve operating speed during error recovery, data write operations, etc.

Figure 1:
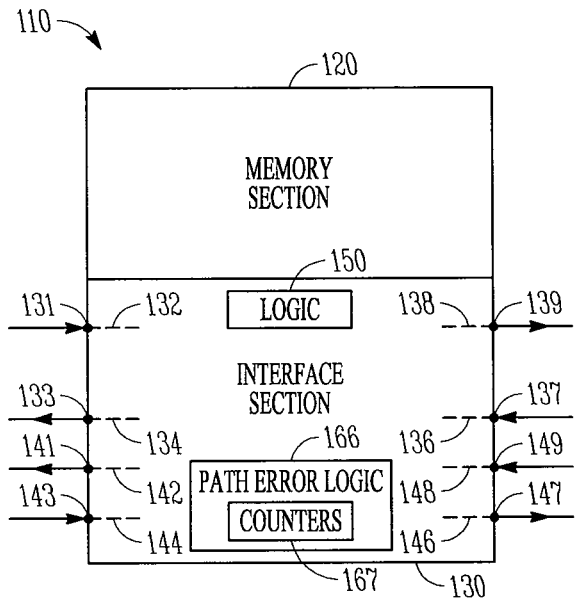
FIG. 1 shows a block diagram of an embodiment of a memory unit including a memory section and an interface section.

FIG. 1 shows an embodiment of an example memory unit 110 having a memory section 120 and an interface section 130. Interface section 130 couples to memory section 120 to access memory section 120, where access can include information flow, for example data flow, into memory section 120 and access can include information flow, for example data flow, from memory section 120. Interface section 130 also couples to components or apparatus exterior to memory unit 110. Interface section 130 can include two or more access channels configured to allow access to memory section 120 from two or more directions of data flow for a read operation and to allow access to memory section 120 from two or more directions of data flow for a write operation. An access channel can include one or more connections into the memory section of a memory unit depending on whether such access is appropriate. For example, a request to write data to a memory section different from memory section 120 of memory unit 110 can be passed on from memory unit 110 or rejected. The flow of information can include requests for data, responses to requests, error messages, requests for data recovery, and other messages in addition to data.

Interface section 130 can be configured to include two access channels for each of the two or more directions. One access channel 132 can be configured to receive data from one direction (from left to right in FIG. 1) and the other access channel 138 to transmit data in the same direction (from left to right in FIG. 1). In the other direction, one access channel 136 can be configured to receive data from the other direction (from right to left in FIG. 1) and the other access channel 134 to transmit data in the same direction (from right to left in FIG. 1). An access channel operating in a given direction can include a number of lines for communication of data, addresses, commands, control signals, and other interactive signals. Access channels 132, 134, 136, and 138 can couple externally at nodes 131, 133, 137, and 139, respectively. Further, nodes 131 and 133 can be configured as a port of memory unit 110. Nodes 137 and 139 can be configured as another port of memory unit 110. Additional ports may be provided, if desired. A port of a memory unit is a physical connection or connector to couple the memory unit to a device or a transmission medium external to the memory unit. A port can include various types of connection pins and connectors. A port may be structured as a single connector or as a configuration of multiple connectors.

Requests for information from memory unit 110 can be received at nodes 131 and 137, which can couple to access channels 132 and 136, respectively. Responses to requests for information can be transmitted from nodes 133 and 139, which can include data from memory section 120 via access channels 134 and 138, respectively. In addition, a request received at node 131 (or 137) of memory unit 110 can be passed on to another memory unit or other device external to memory unit 110 from node 139 (133). Figuratively, the route taken by the passed-on request through memory unit 110 is a path through memory unit 110. A path, in general, is a route taken by a signal. A path through memory unit 110 may be a portion of the path taken by the passed-on request. A path that a given signal can take can include access to memory section 120 of memory unit 110. A request may be transmitted on a route through several devices, where the complete route and/or portions of the complete route can be considered a path.

Memory unit 110 may include additional access channels 142, 144, 146, and 148 and nodes 141, 143, 147, and 149 for memory unit to be disposed in a chain of memory units in which the chain can operate as independent chains providing multiple path operation. Access channels 142, 144, 146, and 148 can couple externally at nodes 141, 143, 147, and 149, respectively. In a dual path arrangement, access channels 132, 134, 136, and 138 can couple externally at nodes 131, 133, 137, and 139, respectively, to provide a path in one of the independent chains and access channels 142, 144, 146, and 148 can couple externally at nodes 141, 143, 147, and 149, respectively, to provide a path of the other independent chain, for example. It is also possible to cross-couple the ports, for example, 132/134 can route data to 146/148.

Interface section 130 can include logic 150 to control use of the access channels of memory unit 110. A switch may be implemented in interface section 130 to provide the access channels. Logic 150 can provide circuitry to allow access to memory section 120 of memory unit 110 in response to a request received from either of two directions in a chain in which memory unit 110 is disposed. Logic 150 can process requests and responses in the two different directions including passing on the requests and responses not directed to memory unit 110. Interface section 130 can include path error logic 166 that can detect path errors, where path error logic 166 can have one or more counters 167 to determine a path error in information flow when the memory unit is coupled in the chain. Path error logic 166 can include a counter 167 set to expect a reply within a set time in response to sending information out from the memory unit. A time-out can indicate an error in communication along the path from memory unit 110 in a chain. Path error logic 166 can include a retry counter 167 configured to count a number, N>0, of retransmissions of information such that N is a limit to the number of retransmissions in response to determinations that previous corresponding transmissions of the information were in error. The determinations can result from a determination of a bad cyclic redundancy check within data flows. Interface section 130 can include retry counters 167 for all directions of information flow supported by memory unit 110. In addition, logic 150 of interface section 130 can reconfigure the memory unit 110 from being an inner memory unit within a chain to functioning as an end memory unit of the chain in response to a command from a controller.

In various embodiments, memory section 120 can include solid state memory devices. Examples of such solid state memory devices include, but are not limited to dynamic random access memory (DRAM), static random access memory (SRAM), flash memory such as NOR or NAND, etc. In addition, the solid state memory devices in memory section 120 can be configured as stacked chip memory devices, where the chip memory devices can be realized as any of the abovementioned solid state memory devices.

Figure 2:
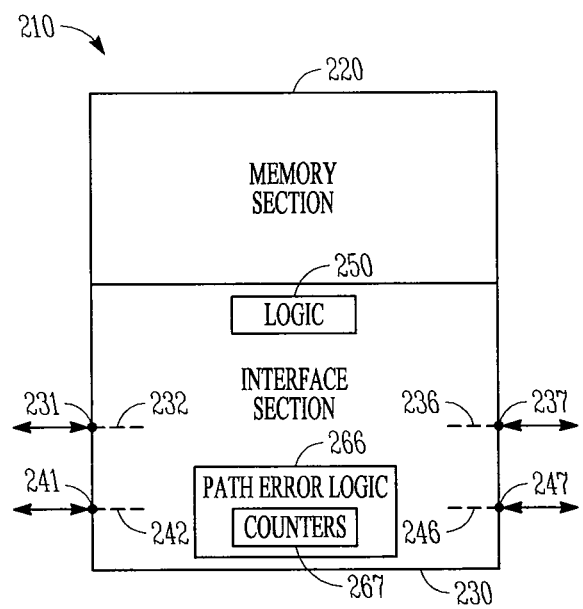
FIG. 2 shows a block diagram of an embodiment of a memory unit including a memory section and an interface section.

FIG. 2 shows an embodiment of an example memory unit 210 having a memory section 220 and an interface section 230. Interface section 230 couples to memory section 220 to access memory section 220, where access can include data flow into memory section 220 and access can include data flow from memory section 220. Interface section 230 also couples to components or apparatus exterior to memory unit 210. Interface section 230 can include access channels configured to allow access to memory section 220 from two directions of data flow for a read operation and to allow access to memory section 220 from two directions of data flow for a write operation. Interface section 230 can be configured to include two access channels, where both access channel 232 and access channel 236 are configured for bidirectional data flow in a simplex connection. In a simplex conduction, bidirectional flow of information is not conducted simultaneously. Access channels 232 and 236 can couple externally at nodes 231 and 237, respectively, to provide a path for a request to access memory section 220 and to provide a path from memory section 220 to provide information in response to a request. Similar to FIG. 1 in which additional paths may be provided, interface section 230 can include additional access channels and ports, arranged for simplex connection, for operation in a chain configured with two independent chains. For example, memory unit 210 may include additional access channels 242 and 246, and nodes 241 and 247 for memory unit 210 to be disposed in a chain of memory units providing for multiple path operation. Access channels 242 and 246 can couple externally at nodes 241 and 247, respectively. In a dual arrangement, access channels 232 and 236 can couple externally at nodes 231 and 237, respectively, to provide a path in one of the independent chains, and access channels 242 and 246 can couple externally at nodes 241 and 247, respectively, to provide a path of the other independent chain, for example. It is also possible to cross-couple the ports, for example, 232 can route data to 246.

Interface section 230 can include logic 250 to control use of the access channels of memory unit 210. A switch may be implemented in interface section 230 to provide the access channels. Logic 250 can provide circuitry to allow access to memory section 220 of memory unit 210 in response to a request received from either of two directions in a chain in which memory unit 210 is disposed. Logic 250 can process requests and responses in the two different directions including passing on the requests and responses not directed to memory unit 210. Interface section 230 can include path error logic 266 that can detect path errors, where path error logic 266 can have one or more counters 267 to determine a path error in information flow when the memory unit is coupled in the chain. Path error logic 266 can include a counter 267 set to expect a reply within a set time in response to sending information out from the memory unit. A time-out can indicate an error in communication along the path from memory unit 210 in a chain. Path error logic 266 can include a retry counter 267 configured to count a number, N>0, of retransmissions of information such that N is a limit to the number of retransmissions in response to determinations that previous corresponding transmissions of the information were in error. The determinations can result from a determination of a bad cyclic redundancy check included within data flows. Interface section 230 can include retry counters 267 for all directions of information flow supported by memory unit 210. In addition, logic 250 of interface section 230 can reconfigure the memory unit 210 from being an inner memory unit within a chain to functioning as an end memory unit of the chain in response to a command from a controller.

Memory section 220 can be configured in a manner similar to or identical to memory section 120. The coupling attained by interface sections 230 and 130 can be conducted such that the differences in memory unit 110 and memory unit 210 can be confined to the interface sections 130 and 230, respectively. Logic 250 of interface 230 includes circuitry to handle a master/slave relationship in which the flow of information includes a simplex connection from each direction. The nodes in interface 130 provide for a duplex connection. In a duplex connection, bidirectional flow of information can be conducted simultaneously.

Figure 3:
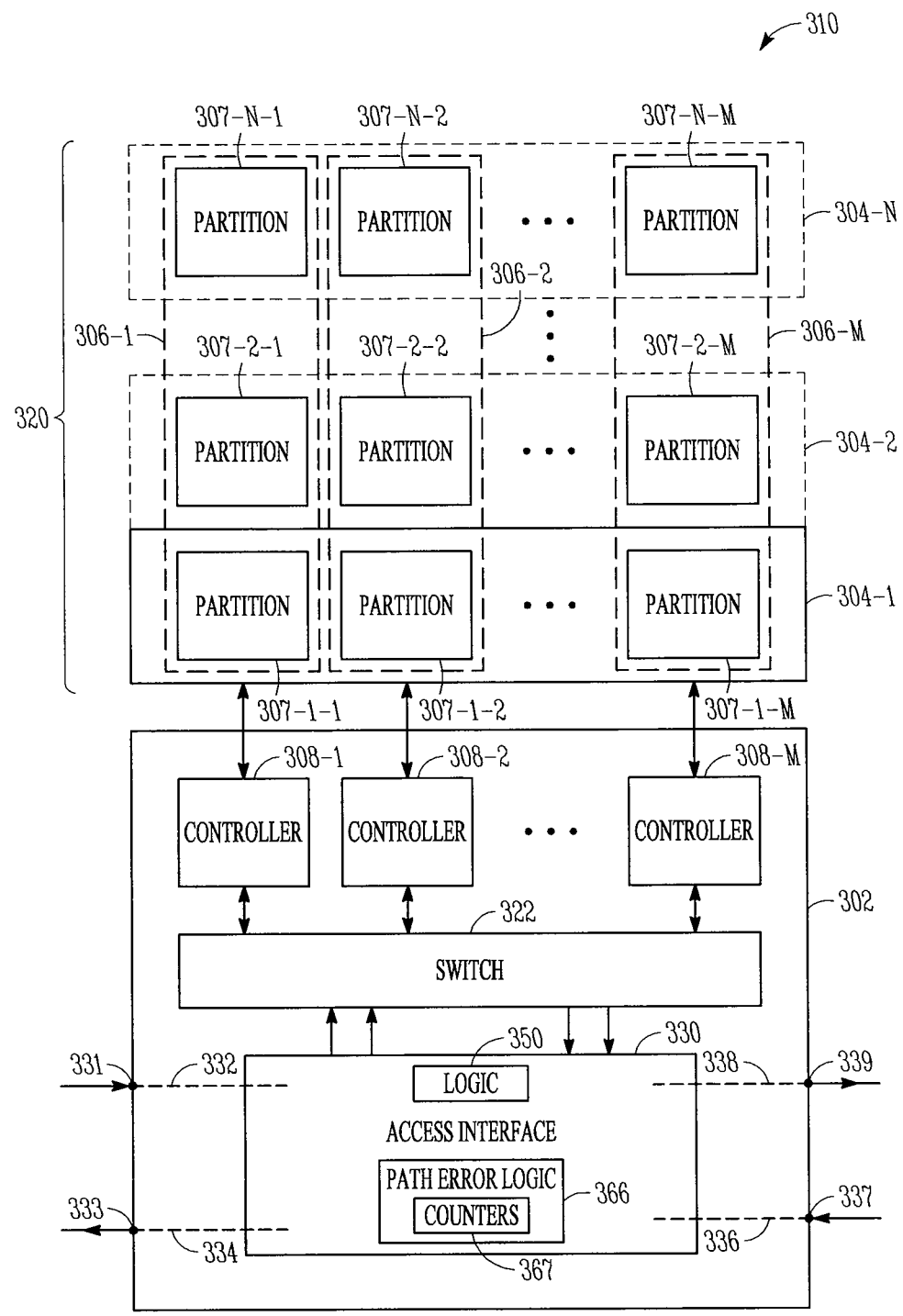
FIG. 3 shows a block diagram of an embodiment of a memory unit implemented as a stacked memory device of individual chips.

FIG. 3 shows a block diagram of an embodiment of a memory unit 310 implemented as a stacked memory device of individual chips (die). Stacked memory device 310 operates to concurrently transfer a plurality of outbound and/or inbound flow of information (e.g., commands, addresses, and/or data) between a source or a destination device and a set of stacked-array memory vaults. A vault is a vertical slice of memory through a stack of memory devices, which can define a number of partitions on a horizontal level associated with individual memory devices in the stack. The source/destination device can be a host that includes one or more processors or another memory unit.

Stacked memory device 310 includes an interface section, such as a logic chip 302 as a base, with a memory section 320 comprising a number of stacked memory chips 304-1, 304-2 . . . 304-N configured with respect to logic chip 302. Each memory chip 304-1 . . . 304-N includes a plurality of partitions. For example, memory chip 304-1 includes partitions 307-1-1, 307-1-2 . . . 307-1-M, memory chip 304-2 includes partitions 307-2-1, 307-2-2 . . . 307-2-M, and memory chip 304-N includes partitions 307-N-1, 307-N-2 . . . 307-N-M. Each partition can include multiple memory banks. Partitions 307-1-1, 307-2-1 . . . 307-N-1 from stacked memory chips 304-1 . . . 304-N make up vault 306-1. Partitions 307-1-M, 307-2-M . . . 307-N-M from stacked memory chips 304-1 . . . 304-N make up vault 306-M. In the example shown, each of vaults 306-1 . . . 306-M is controlled by its own vault controller 308-1, 308-2 . . . 308-M, respectively. In the example shown, a switch 322 is included in device 310 to route memory operations to and from various vaults 306-1 . . . 306-M. Switch 322 can be configured as a crossbar switch.

Logic chip 302 includes interface section 330 to transfer data to and from memory chips 304-1 . . . 304-N via switch 322 and vault controllers 308-1 . . . 308-M. Interface section 330 can be configured to include one, two, or more access channels for each of the two directions. Interface section 330 can include logic 350 to control use of the access channels of stacked memory device 310. One access channel 332 can be configured to receive data from one direction and the other access channel 334 to transmit data back in the opposite direction. In the other direction, one access channel 336 can be configured to receive data from the other direction and the other access channel 338 to transmit data back in the opposite direction. Access channels 332, 334, 336, and 338 can couple externally at nodes 331, 333, 337, and 339, respectively, to access the stack of memory dies based on a received request with information provided from the stack as a response. Interface section 330 can provide a path through memory unit 310 between nodes for requests and responses to be passed on by memory unit 310. Alternatively, in place of access channels 332, 334, 336, and 338 and corresponding nodes 331, 333, 337, and 339, stacked memory device 310 can include two access channels and two corresponding nodes for bidirectional data flow using simplex connections to operate in a manner similar or identical to that of the device shown in FIG. 2. Alternatively, logic chip 302 can include additional access channels and ports (not shown) for operation in a chain configured as two independent chains.

Interface section 330 can include logic 350 to control use of the access channels of memory unit 310. A switch may be implemented in interface section 330 to provide the access channels. Logic 350 can provide circuitry to allow access to memory section 320 of memory unit 310 in response to a request received from either of two directions in a chain in which memory unit 310 is disposed. Logic 350 can process requests and responses in the two different directions including passing on the requests and responses not directed to memory unit 310. Interface section 330 can include path error logic 366 that can detect path errors, where path error logic 366 can have one or more counters 367 to determine a path error in information flow when the memory unit is coupled in the chain. Path error logic 366 can include a counter 367 set to expect a reply within a set time in response to sending information out from the memory unit. A time-out can indicate an error in communication along the path from memory unit 310 in a chain. Path error logic 366 can include a retry counter 367 configured to count a number, N>0, of retransmissions of information such that N is a limit to the number of retransmissions in response to determinations that previous corresponding transmissions of the information were in error. The determinations can result from a determination of path error detection including, for example, a bad cyclic redundancy check included within data flows. Interface section 330 can include retry counters 367 for all directions of information flow supported by memory unit 310. In addition, logic 350 of interface section 330 can reconfigure the memory unit 310 from being an inner memory unit within a chain to functioning as an end memory unit of the chain in response to a command from a controller.

Stacked chip memory device 310 aggregates control logic at logic chip 302, which might otherwise be located on each individual memory array die. In this way, memory vaults 306-1, 306-2 . . . 306-M can share a single logic die with copies of control logic for each vault. The memory vault architecture can thus strategically partition memory control logic to increase energy efficiency while providing a finer granularity of powered-on memory banks. Such a stacked memory device enables implementation of a standardized host processor to memory system interface. The standardized interface may reduce re-design cycle times as memory technology evolves. Alternatively, different logic bases can be made for different customers, keeping the same memory dies.

In an architecture that includes memory units, such as memory chips and/or stacked memory chips, configured serially in a chain, a fairly small amount of logic added to the chaining capability can enable full recovery of bad data from one of the chained memory units, for example, by the addition of a single memory unit to the end of the chain. Such an architecture is disclosed in U.S. patent application Ser. No. 12/479,530. In various embodiments as disclosed herein, architectures of chained memory provide enhanced error recovery capabilities to the error recovery capability of the architectures disclosed in U.S. patent application Ser. No. 12/479,530. In various embodiments, a generalized IO protocol, along with additional functions in the logic of the memory units configured for chaining and in the logic of associated controllers, can be implemented such that both ends of the chain can make data related requests. Such an architecture can enable full recovery from most path and memory unit errors. In addition, the configuration of the architecture enables an effective doubling of the available bandwidth associated with a set of memory units.

Since a path is a route taken by a signal such as a request or a response, a path can include the connections through each memory unit in a memory chain to be traveled by the signal travelling from its origin to its destination and the connections between memory units. The connection between adjacent memory units in a memory chain and the connection between a controller and an adjacent memory unit is referred to herein as a link. A path error is an error that can occur anywhere along the path, which includes errors within a memory unit of the memory chain and errors in links of the memory chain.

Discussed herein are architectures that establish the capability to recover from the failure of any single memory unit in a group of protected components. Also discussed herein are embodiments of architectures that establish the capability to recover from the failure of a memory module built with memory units in a group of protected modules. These memory units discussed with respect to FIGS. 5-13 can include memory units similar or identical to the memory units 110, 210, and 310 discussed with respect to FIGS. 1-3.

Figure 4:
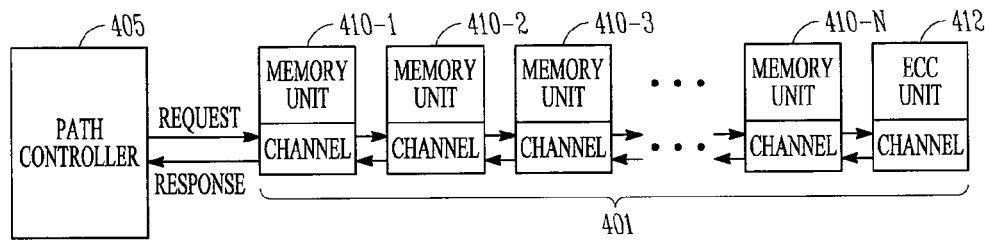
FIG. 4 shows a configuration of memory units configured in a serial chain that includes an additional memory unit to hold error recovery information.

FIG. 4 shows a configuration of memory units 410-1, 410-2, 410-3 . . . 410-N configured in a serial chain 401 that includes an additional memory unit 412 to hold error recovery information. This structure is disclosed in U.S. patent application Ser. No. 12/479,530, and is discussed herein to aid in describing the capabilities of the various embodiments of the invention. The additional memory unit in serial chain 401 is an error check and correcting unit, where, herein, error check and correcting is referred to as ECC, such as ECC unit 412. Memory units 410-1, 410-2, 410-3 . . . 410-N and ECC unit 412 are configured serially as components of chain 401. Serial chain 401 is coupled to a path controller 405. Path controller 405 controls the flow of information along serial chain 401, where the path can depend on the memory unit being addressed. In serial chain 401 for this example architecture, requests flow in one direction and responses flow in the other direction. This approach has been simplified for clarity, but data is intended to flow in both directions at the same time in FIG. 4.

When a write operation is dispatched from path controller 405, the memory unit (one of memory units 410-1, 410-2, 410-3 . . . 410-N) that is the destination of the write request sends error recovery information to the ECC unit 412 at the end of the chain. ECC unit 412 updates its recovery information so that the newly-written data can be recovered rather than information that was previously stored at the same location in the written memory location. With the understanding that the data at the same address x of each memory unit is $M_i(x)$ for each of the memory data units, 410-$i$, the data in ECC unit 412 for the same address x is $M_{ECC}(x)=M_{410-1}(x)+M_{410-2}(x)+ \ldots +M_{410-N}(x)$, for all memory units along the chain. In some embodiments, in the circuitry of the components of chain 401, both addition and subtraction can be accomplished as Boolean XOR operations.

If an unrecoverable data error occurs when reading data from one of memory units 410-1, 410-2, 410-3 . . . 410-N, the memory unit reports its error to the path controller 405, which then sends a recovery request down chain 401. Each memory unit in chain 401, with the exception of the memory unit that had the data error, reads data from its local memory at the same local memory address as that of the failed memory unit and holds that information. The recovery request propagates to ECC unit 405, which reads its ECC data at the indicated address and returns that data back up chain 401. Data in ECC unit 405, at an address, is the sum of the data in each memory unit in chain 401 at the same address. As each memory unit, except the memory unit that had the data error, receives the response data along the return path from ECC unit 405, each such memory unit subtracts its local data from that currently contained in the returning response. In some embodiments, the subtraction can be accomplished using a Boolean exclusive-OR (XOR) operation. Each memory unit that performs the subtraction sends its subtraction result to the next memory unit up chain 401 towards path controller 405. When the first memory unit in chain 401 returns the data response to path controller 405 after all the subtractions have been performed along the return path from ECC unit 405, the returned data is the same as the data that was last stored in the failed memory reference. For example, when memory unit 410-2 has a data error, the result from the returned data is $M_{ECC}(x)-M_{410-N}(x)- \ldots -M_{410-3}(x)-M_{410-1}(x)=M_{410-2}(x)$.

Read and write operations seen from the perspective of path controller 405 are conducted so that data bandwidth and latency are little affected by the added operations that occur on writing and when recovering failed reads. Thus, when errors occur, the error recovery process described above has good performance from the perspective of path controller 405. When executing a write operation, the update to the ECC unit 412 takes place over chain 401, which is a path from path controller 405 to ECC unit 412, that looks like all write operations proceed down the whole length of chain 401. Normal read operations leave the path unused past the memory unit processing the read command. When recovering from a read failure, the timing takes a time interval about equal to that of a read operation from the last unit in the chain, which is ECC unit 412.

The recovery process for data errors in a memory unit described above with respect to the architecture illustrated in FIG. 4, in which requests flow in one direction and responses flow in the other direction, does not always work in the presence of path errors. If one of the links between memory units 410-1, 410-2, 410-3 . . . 410-N fails or the path through one of the memory units fails, then no data past the fault can be accessed. A fault in a path through a memory unit can include a fault of a logic element in the memory unit.

Figure 5:
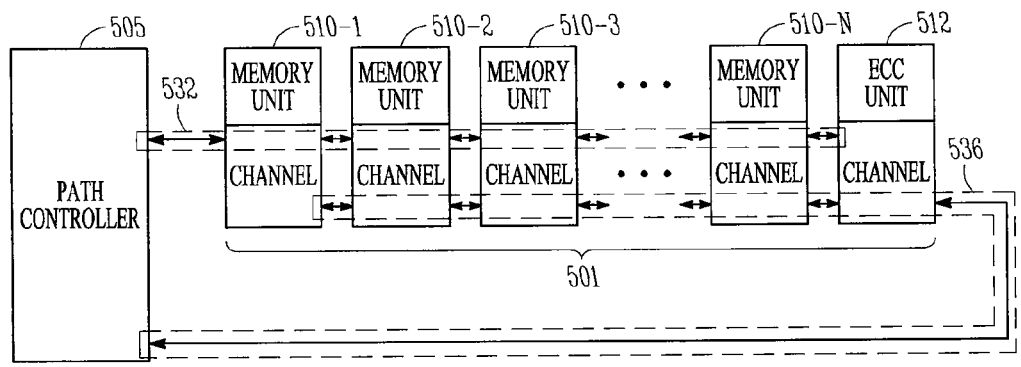
FIG. 5 shows an embodiment of an architecture for a chain of memory units configured serially having a dual-path recovery structure.

FIG. 5 shows an embodiment of an architecture for a chain 501 of memory units 510-1, 510-2, 510-3 . . . 510-N configured serially having a dual-path recovery structure. Coupled as a component of chain 501 is ECC unit 512. Chain 501 can be configured as two chains 532 and 536 providing two independent paths for flow of information. Chain 532 is coupled to a path controller 505 from memory unit 510-1 and the other chain 536 is coupled to path controller 505 from ECC unit 512. The two chains 532 and 536 can operate as independent chains. For chain 532, requests within the chain flow from left to right and responses flow from right to left in FIG. 5. For chain 536, requests flow from right to left and responses flow from left to right in FIG. 5. Each memory unit 510-1, 510-2, 510-3, . . . 510-N can be accessed as part of chain 532 or part of chain 536 from controller 505. To implement the two path implementation shown in FIG. 5, memory units 510-1, 510-2, 510-3, . . . 510-N and ECC 512 can be configured with an increased number of pins to form two independent chains and can be structured similar to or identical to memory unit 110 of FIG. 1 or memory unit 310 of FIG. 3. For ease of discussion, FIG. 5 shows double-headed connection lines, though duplex communication can be used with the increased number of pins. Alternatively, these memory units can be configured having an increased number of pins with simplex connections as discussed with respect to memory unit 210 of FIG. 2. The two path implementation shown in FIG. 5 can generally outperform the implementation of FIG. 4, because two paths, along chain 532 and chain 536, can access the same memory units at the same time.

The architecture of FIG. 5 modifies the architecture shown in FIG. 4, where the modification includes a second set of access channels for requests and responses added to each memory unit along with logic in the memory unit, providing a two path implementation for a memory chain. The second set of access channels to each memory unit is added in the opposite connection sequence as that of the set of first access channels such that a request can be received along a path in the opposite connection sequence of the chain to access the memory section of the memory unit in addition to the capability to receive a request coupled to the first set of access channels along a path in the original connection sequence of the chain. For example, with memory unit 110 of FIG. 1 configured in a chain, with access channel 132 coupled to node 131 as the first channel configured to receive a request along one path and pass along, as needed, thru 138/139, access channel 148 is the second channel coupled to node 149 to receive a request along another path in which the request travels in the opposite direction as the request using access channel 132, which is passed along on path 142/141 as needed. As shown, the implementation of the second set of access channels for information flow along a second path includes using additional pins for the memory unit to handle the associated information.

Then, in this embodiment for a chain of memory units, if a memory unit or a path totally fails, each memory unit can be accessed, with the possible exception of the failed memory unit, from one or both of the paths to the memory unit. This means that, through the use of the combined paths, full recovery can be conducted for most single path or single unit faults. Such improved error recovery can be attained with appropriate logic in the path controller of the chain to implement the operations and with the doubling of pins on each unit to support coupling the two sets of access channels to the two paths. The added capability to access a memory section of a memory unit from another path enables additional bandwidth in normal operation, along with the upgraded error recovery capability. Alternatively, the bandwidth of each channel can be reduced such that the total bandwidth is little changed in normal operation by, for example, setting a limit on the number of pins connected to a module.

Figure 6:
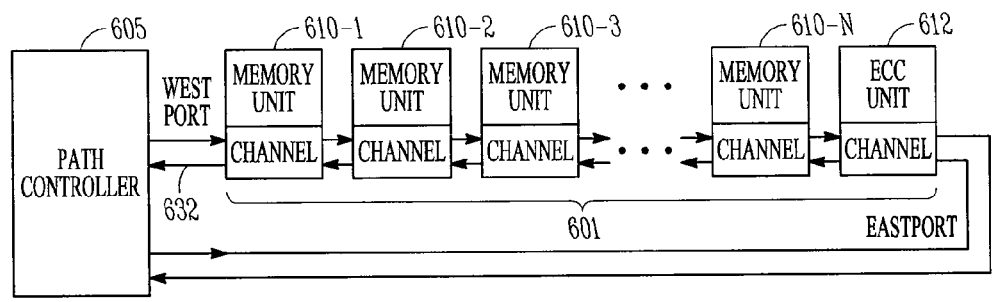
FIG. 6 shows an embodiment of an architecture for a chain of memory units configured serially having a single path recovery structure.

FIG. 6 shows an embodiment of an architecture for a chain 601 of memory units 610-1, 610-2, 610-3 . . . 610-N configured serially having a single path recovery structure. This architecture provides a single path recovery structure, chain 601 operates as a single chain, whereas chain 501 of FIG. 5 operates as two chains. Coupled as a component of chain 601 is ECC memory unit 612. One end of chain 601 is coupled to a path controller 605 from memory unit 610-1 and the other end of chain 601 is coupled to path controller 605 from ECC unit 612.

The single path implementation shown in FIG. 6 results from access to the memory units accomplished by modifying the master/slave relationship of the path protocol of the architecture of FIG. 4 to a protocol in which a request can be received at a memory unit from either direction in the chain and a response can be sent from a memory unit in either direction in the chain. The two directions, herein, can be referred to as 'West' and 'East' to refer to the ports on either side of a memory unit with respect to chain 601, as shown in FIG. 6. Memory units 610-1, 610-2, 610-3 . . . 610-N and ECC unit 612 can be structured similar to or identical to memory unit 110 of FIG. 1 or memory unit 310 of FIG. 3 in which additional access channels and corresponding ports are not used or not provided for operation in a chain configured as two independent chains. Alternatively, these memory units can be configured with simplex connections as discussed with respect to memory unit 210 of FIG. 2.

With this modified protocol, all memory units 610-1, 610-2, 610-3 . . . 610-N can still be accessed, as shown in FIG. 6, but the number of pins needed to implement connections of the memory units to the links to adjacent memory units or to adjacent path controller 605 are approximately half of the pin count used in the architecture of FIG. 5. With the enhanced path protocol, a memory unit, memory unit 610-3 for example, can be accessed from its East side or its West side, and both requests and responses can flow in either direction in chain 601.

In addition to avoiding the double-connection of memory units of the architecture of FIG. 5, the architecture of FIG. 6 may reduce some of the complexity that results from ECC unit 512 being at the far end of path 532, while ECC unit 512 is at the near end of path 536. The trade-off is that the total memory bandwidth is reduced for the architecture of FIG. 6, because a single set of links to a memory unit is shared by the two different ports in controller 605, sometimes resulting in path conflicts that limit total bandwidth. In addition, each port sees ECC unit 612 in a different position. A West port sees ECC unit 612 at the end of chain 601 and an East port sees ECC unit 612 at the beginning of chain 601. With the protocol for this embodiment, requests can also be sent through the east port as well as the west port.

The error recovery implemented with respect to FIG. 4 is based on a channel protocol in which the path controller issues all requests for data, along with any write data commands, that always flows in one direction from the path controller in the direction of a memory unit with the ECC memory unit last in the chain. Responses from the memory units usually proceed in the reverse direction that is toward the path controller. This flow is used with the architecture of FIG. 5 in that the ECC update performed when writing data to the chain of memory units is in the same direction as for memory requests for data for each chain 532 and 536. In a similar way, when performing a read-recovery operation in the architecture of FIG. 5 for requests made through path 532, the request flows from path controller 505 and the correction response flows from the ECC unit 512 through all memory units 510-1, 510-2, 510-3, . . . 510-N to path controller 505. For a read-recovery operation for requests made through path 536 the response flows from 510-1, 510-2 . . . through 512.

In the architecture illustrated in FIG. 6, either end of chain 601 can make memory requests. This means that requests can flow in either direction, and the same is true for memory responses. In an embodiment, the architecture of FIG. 6 can be constructed such that responses to requests will return to the port that made the request, which can simplify the design of path controller 605. With serial chain 601 operated with path controller 605 in this manner each port of controller 605 and the memory units of chain 601 can function at full bandwidth in normal operation and average memory latency can be reduced.

Figure 7:
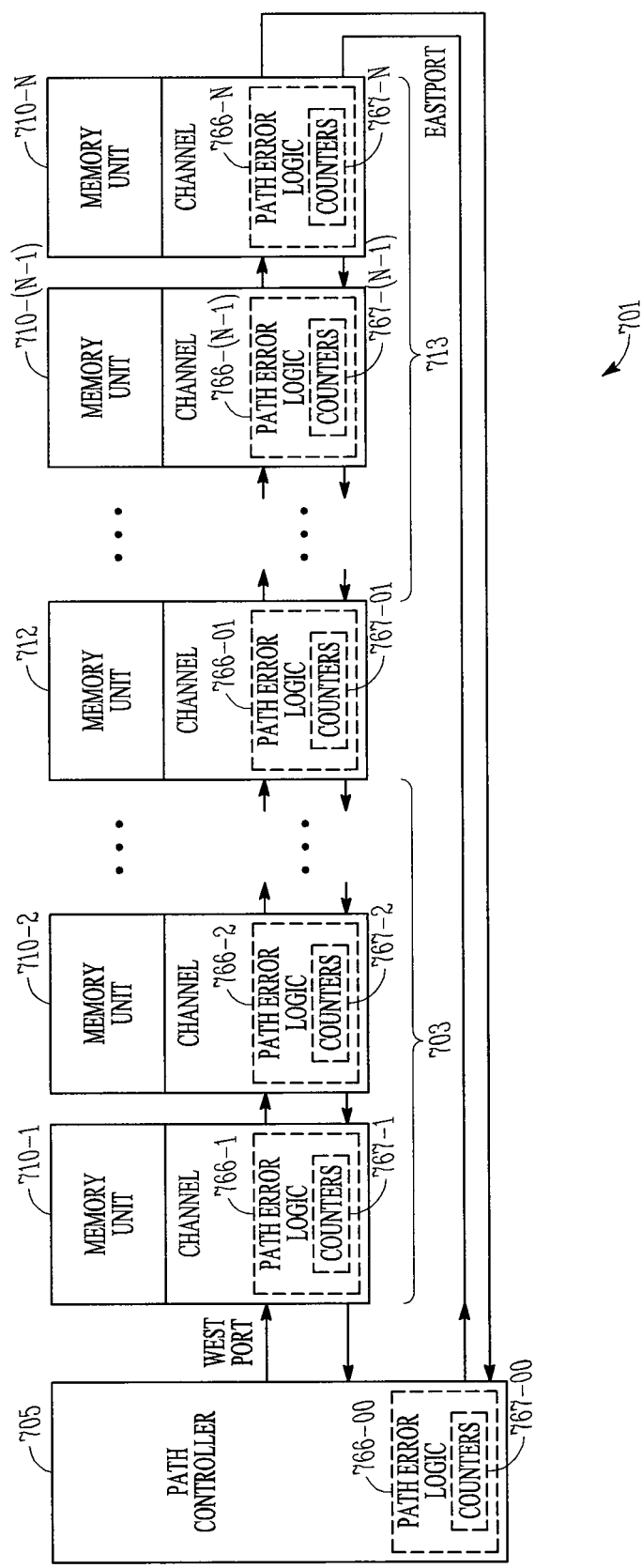
FIG. 7 shows an embodiment of an architecture for a chain of memory units configured serially having a single path recovery with double bandwidth.

FIG. 7 shows an embodiment of an architecture for a chain 701 of memory units 710-1, 710-2 . . . 710-(N−1), 710-N configured serially having a single path recovery with double bandwidth. Coupled as a component of chain 701 is ECC unit 712. Memory units 710-1, 710-2, . . . 710-(N−1), 710-N and ECC unit 712 can be structured similar to or identical to memory unit 110 of FIG. 1 or memory unit 310 of FIG. 3 in which additional access channels and corresponding ports are not used or not provided for operation in a chain configured as two independent chains. Alternatively, these memory units can be configured with simplex connections as discussed with respect to memory unit 210 of FIG. 2.

One end of chain 701 is coupled to a path controller 705 from memory unit 710-1 and the other end of chain 701 is coupled to path controller 705 from memory unit 710-N. Alternatively, the ends of chain 701 can connect to separate path controllers, if the controllers can communicate to perform error recovery operations. ECC unit 712 is substantially centrally disposed in chain 701 in a serial configuration with memory units 710-1, 710-2 . . . 710-(N−1), 710-N. When ECC unit 712 is a separate unit from the N memory units and N is even, ECC unit 712 can be located in the middle of chain 701 having the same number of memory units on both sides. In various embodiments, ECC unit 712 can be located at any position of chain 701. Located at any position that is not an end of the chain 701, ECC unit 712 can effectively form two sub-chains. The two sub-chains can be operated as two serial sections of chain 701, shown as sub-chains 703 and 713. The two sub-chains can be operated as two virtual chains.

Along with ECC unit 712 being placed into the middle of chain 701, path controller 705 is implemented to take into account the partitioning of chain 701 into two serial sections, serial section 703 and serial section 713. Serial section 703 includes the memory units between path controller 705 and ECC unit 512 whose West ports are closer to the path controller 705 along the West direction. Serial section 713 includes the memory units between path controller 705 and ECC unit 512 whose East ports are closer to path controller 705 along the east direction. In various embodiments, the serial sections of a memory chain operate as sub-chains.

An address bit can be used to select a particular serial section. The address bit having one value selects one serial section and the address bit having another value selects the other serial section. For example, a bit having a value of zero represents serial section 703 and a bit having a value of one represents serial section 713 (or vice versa). In this example, if the section address bit is a zero for a particular request, the request is sent to memory units 710-1, 710-2, and whatever memory units are on that side of ECC unit 712, which is serial section 703. This transmission can be directed to the West ports of the memory units in serial section 703. If the section address bit is a one, the request is sent to memory units 710-(N−1), 710-N, and whatever memory units are on that side of ECC unit 712, which is serial section 713. This transmission can be directed to the East ports of the memory units in serial section 713. A decode of multiple address bits can also be used to separate requests to the different ports.

It is not required for correct operation that path controller 705 divides requests according to serial sections of chain 701. If the implementation of chain 701 as two sections is not used, then a request can be satisfied from whatever memory unit that corresponds to the correct memory unit address that is specified within each request. Since use of a set of links may be shared by different ports of path controller 705 or memory unit of chain 701, the total bandwidth can be limited by link congestion. However, with accesses to memory separated by the state of a section address bit discussed above, requests can be separated, so total bandwidth utilization can be increased due to reduced traffic contention. Operation of the components of chain 701 work as if the chain is functionally two chains 703 and 713, but with a shared ECC unit 712.

The above section address selection can be preformed during normal operation. As a result, the bandwidth of the chain of memory units can be double that of a chain with only a single direction for performing normal operations such as writing to a memory unit with an ECC unit at the far end of the chain from the path controller. This doubling is based on the shared ECC unit 712 having sufficient internal bandwidth. In various embodiments, during normal operation, ECC unit 712 is only accessed during write operations and not during read operations.

During error recovery, path controller 705 sends requests to both sections of chain 701, to recover from or to get around a particular fault of chain 701. Thus, in recovery sequences, the use of a section address bit can be ignored as indicated by the particular fault.

At configuration time, each memory unit 710-1 . . . 710-N is given an identification (ID) as a memory unit. The identification can be used in the flexible information flow features of the architecture of FIG. 7. Each memory unit 710-1 . . . 710-N can receive requests from either direction in chain 701, that is, at either port, the West port or the East port. If a request comes into a memory unit that is not for that memory unit, as determined by the ID of the memory unit, the logic in the memory unit sends the request down the path of chain 701 going in the same direction as the request was received. Memory units at the ends of the serial sections 703 and 713 can be informed of this pass through of the request. With this feature, if correct and reliable link communication cannot be established, the logic in a memory unit can determine that a serial section of a chain does not function past that point and configure the memory unit as the end of that local serial chain.

By placing ECC unit 712 in the middle of chain 701 and dividing chain 701 into two serial sections 703 and 713, which operate as two sub-chains, access latency is reduced in normal operation over that of an un-partitioned chain, which would operate as a longer chain. As another option, depending on how many memory units are to be accessed, the number of memory units, keeping the ECC memory unit in the middle of the chain, can be doubled so that the normal access time is the same as if the ECC unit is at the end of a shorter chain. In such a case, there is still a single ECC memory unit, but that ECC memory unit is connected to twice as many memory units for data, which can provide a cost savings. For example, rather than having two chains of five units (4 memory units+1 ECC unit), one chain of 9 memory units (8 memory units+1 ECC unit) can be implemented with access on each end of the chain configured with the ECC unit in the middle. The access latency and bandwidths will essentially be the same for the implementation of the single chain as for the implementation of the two chains, but the second ECC unit is not required in the single chain implementation. Even though the two shorter memory chains can have higher performance in the presence of simple data failures, the two shorter chains can not recover from the range of faults covered by the longer single chain with dual access.

In the example embodiments shown in FIGS. 5-7 above, two ports of a chain are coupled to a single controller. In various embodiments, each port, West and East, of a memory unit can be under control of separate controllers or virtually under two controllers. In such cases, the two controllers are configured to communicate with each other as appropriate for recovery in presence of the various failure modes. Thus, each of controllers 505, 605, and 705 of FIGS. 5-7 can be realized as multiple controllers communicatively coupled to each other. In an embodiment, two controllers are coupled to a serial chain of memory units with one controller managing information flow in one direction of the chain and the other controller managing information flow in the other direction of the chain. In an embodiment, two controllers are coupled to a serial chain of memory units with one controller managing information flow with respect to the west ports of each memory unit in the chain and the other controller managing information flow with respect to the east ports of each memory unit in the chain.

In various embodiments, a chain of memory units can be accessed from both ends of the chain without including an ECC unit to enable full recovery from faults of components in the chain. Such an approach is applicable if the major source of failures is that of the path, made up of pins, connectors, wiring. The two ports of a memory unit can provide recovery from these faults without an ECC memory unit.

Figure 8:
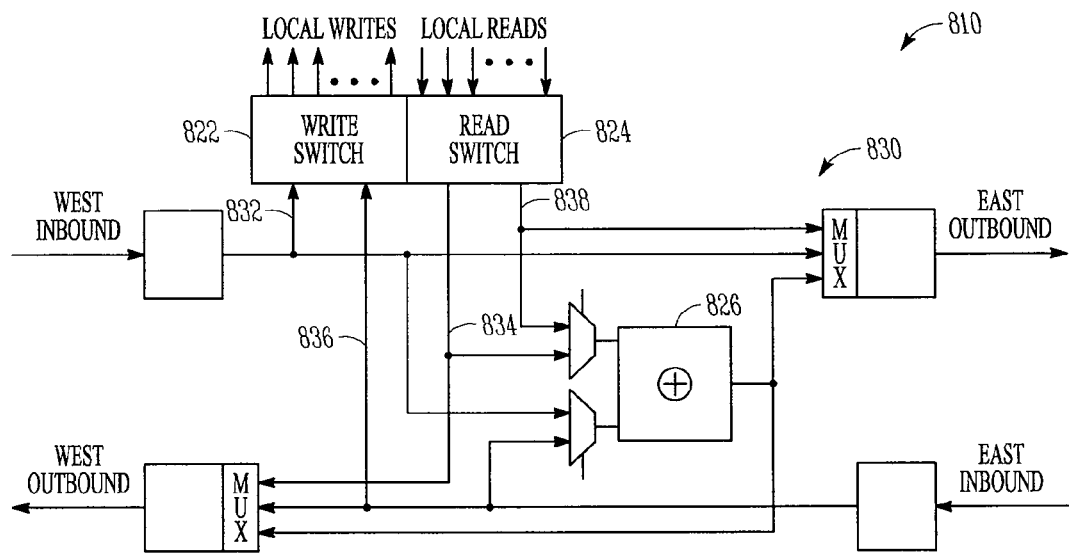
FIG. 8 shows a block diagram of logic for data flow in a memory unit.

FIG. 8 shows a block diagram of logic for data flow in a memory unit 810 in an embodiment. In a non-limiting manner, the features in FIG. 8 shows only data paths that provide input/output (IO) for a memory unit and some functions that can be used within read recovery operations. Memory unit 810 includes an interface section 830 to transfer data to and from a memory, which is a data storage area, of memory unit 810. Interface section 830 includes a write switch 822, using access channels 832 and 836, to direct data to the memory of memory unit 810 and a read switch 824 to retrieve data from the memory of memory unit 810, using access channels 834 and 838, in response to a data request.

Interface section 830 includes an XOR block 826 to implement error recovery within memory unit 810. XOR block 826 performs the function of subtracting the local data from read recovery data as that data is passed back up a chain, in which memory unit 810 is configured, during a recovery operation. The structure of interface section 830 can be modified, depending on a particular implementation and timing. For example, read data may be routed through XOR block 826 rather than directly from the read switch 824 to the outbound ports if appropriate gating control is built into XOR block 826 to meet any timing specifications for memory unit 810.

Figure 9:
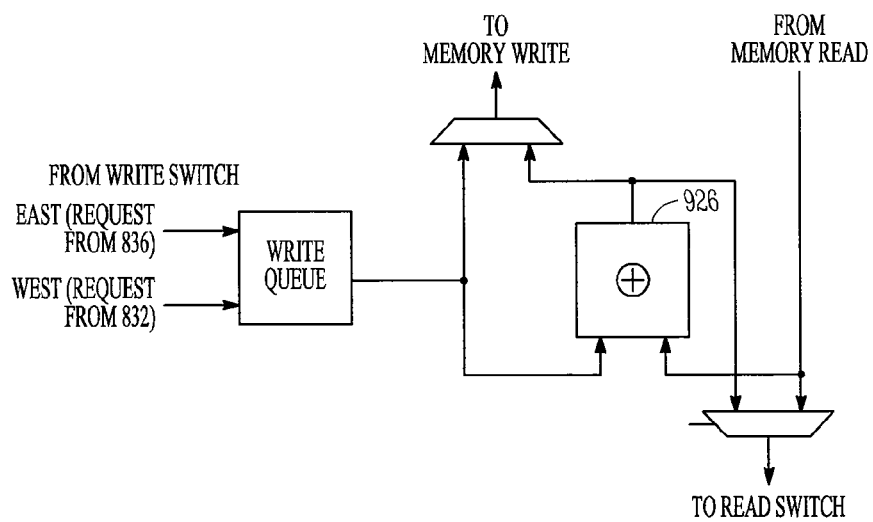
FIG. 9 shows a block diagram of an embodiment of local logic in a memory unit to perform an XOR function.

FIG. 9 shows a block diagram of an embodiment of local logic in a memory unit to perform the XOR function. XOR block 926 of the memory unit is used to implement the ECC update function in the ECC unit and the write difference function that is sent to the ECC unit for write updates in the memory chain. XOR block 926 performs two functions. One function is to calculate a read-write difference to be passed to the ECC unit during a normal write operation in the memory chain. The second function is to add the read-write difference to the ECC data in the ECC memory unit.

During normal operation of a memory unit in a memory chain, both the West and East access ports are operational at the same time, as each port of the memory unit passes on requests and responses to only the memory units on its half of the total path. When writing, using XOR block 926 shown in FIG. 9, the memory unit accepting the write request can calculate the difference between the data, which has been stored up until the time of the write request, with the data being written. The difference is sent to the ECC unit at the same time as the write function is being performed in the memory of the memory unit. The difference request is sent along the same direction as that of the write request, where the ECC unit is in the middle of the chain. The effect for a memory chain with an ECC unit in the middle of the chain is one in which each write request propagates halfway down the path to the ECC memory unit.

The ECC memory unit receives a write difference update request and reads the referenced address. The contents of that address are subjected to an XOR operation with the difference data and then written back into memory, using XOR block 926 shown in FIG. 9. This action constitutes a read-modify-write operation.

When reading, a read request is sent down the chain using the correct port. The referenced memory unit checks the data, possibly correcting it if a correctable error is detected. The data is returned to the same port making the request.

There are multiple ways in which a fault can occur in a chain-based memory system. One kind of fault is a data error, in which a memory unit has an unrecoverable data error and the memory units and links along the paths are fully functional. Another kind of fault is a broken link, in which a link between two memory units is not functioning correctly but with all memory units functioning correctly. Each memory unit is fully operational using the other port, the port and path not including the broken link. A third kind of fault is a broken memory unit, in which the memory unit is not functioning and neither port for the failing memory unit can communicate. A broken memory unit is a complete failure of the memory unit.

It is possible within the structure for a memory chain, which is configured to receive and send in both directions, to determine which direction of a link is failing and then to work around that particular failure. In various embodiments, there is no effort made to distinguish an outbound failure from an inbound failure of the same link. This is because all link communications are closed: every communication is acknowledged in some fashion by data in the other direction of the same link. If either direction of a link cannot communicate reliably and correctly, the link is considered to be down.

Data error recovery in a memory chain of memory units serially configured, as illustrated in FIG. 7, differs, in some aspects, from data error recovery as implemented in the memory chain of FIG. 4, because of the location of the ECC unit in the middle of the chain rather than as the last component of the memory chain. In data recovery for centrally located ECC unit, a memory unit detects that it has an unrecoverable read error. The memory unit sends an error message to the path controller in a manner such that the path controller identifies the memory unit and the requested address. One way to implement this sequence includes using an operation to tag requests, with the path controller keeping the request information, including the tag information, until a request is released. In such an implementation with the path controller maintaining the request information, only the request tag is returned along with an error type, the path controller then using the returned tag to look up the saved information.

The path controller sends a recovery request down the chain to the same ports as the original request was made. The recovery request includes the ID of the failed memory unit, as well as the address referenced. The ID can be the numbered position in the chain. Each memory unit, except the one in which the request for data failed, uses the referenced address to read its own data at the referenced address. The local data is retrieved from the memory of each of these memory units and is stored for further processing in the data recovery. The data can be stored in the XOR block 826 shown in FIG. 8. The ECC unit also retrieves the data in its memory at the referenced address.

With the ECC unit in the middle of the chain such that the chain is partitioned into two serial sections, the ECC Unit is the last memory unit in one of the serial sections for data flow from the path controller into the West ports of the memory units in this serial section. The ECC Unit is also the last memory unit in the other one of the serial sections for data flow from the path controller into the East ports of the memory units in this other serial section. The last memory unit, upon referencing the requested data at the referenced address, places the data on the path, returning it toward the original request. As each memory unit in a serial section of the chain receives the returning data item, it performs an XOR operation of the data item with that data previously read and stored in response to the recovery request. The result of the XOR operation is passed up the line to the next memory unit for the next memory unit to perform its XOR operation in passing data for recovery to the path controller. The failing memory unit, with respect to a data error, passes the request down the line to the next component.

For the serial section in which the data error did not occur, the path controller sends a recovery request down the chain in the other direction. For example, if the memory units in the serial section in which the data error occurred received the recovery request at its West port, the second recovery request is sent to the memory units in the other serial section to their East ports. When receiving this second recovery request at an East port, the ECC memory unit returns a response with zeros instead of the data at the referenced address. The zeros response is through the memory units of this other serial section to the path controller with each memory unit conducting its recovery XOR operation on the data received from the previous memory unit. The data for recovery, having been operated on by each of the memory units from the ECC unit to the path controller, is received at the path controller from the serial section in which the data error did not occur. The controller operates on the two responses that it received, one from each of the two ports connected to the chain. When data from the two responses are operated on at the path controller, the result is the recovered data. The path controller can sum the two responses using an XOR operation, in various embodiments.

Consider the following non-limiting example of the above procedure for data recover using the architecture of FIG. 7 with N=4, for this example. As shown, memory units 710-1 and 710-2 are coupled to the path controller in serial section 703 through their West ports. As shown, memory units 710-3 and 710-4 are coupled to the path controller in serial section 713 through their East ports. The data stored in ECC unit 712 is the sum of data from these memory units of chain 701. In this example, let A represent the data stored in memory unit 710-1 at the referenced address, B represent the data stored in memory unit 710-2 at the referenced address, C represent the data stored in memory unit 710-3 at the referenced address, and D represent the data stored in memory unit 710-4 at the referenced address. The data stored in ECC unit 712 at the referenced address in this example is A+B+C+D. If memory unit 710-2 in serial section 703 is the failed memory unit, then the response to the first recovery request returns the data response, A+B+C+D−A=B+C+D to path controller 705. The second recovery request returns 0−C−D=−C−D, where ECC unit 712 returns 0 in response to the second request. With path controller 705 summing the two data responses, which can be performed using an XOR operation, in various embodiments, the result of the summing is (B+C+D)+(−C−D)=B. The resulting sum of the data items is the recovered data from the data failure in memory unit 710-2.

Alternatively, the data recovery can be accomplished using a single recovery request rather than two recovery requests. In this procedure, the ECC memory unit in the middle of the memory chain is not considered to be the end of two sub-chains, in which two recovery requests are used. The ECC memory unit is treated as another memory unit in the memory chain and the recovery request is sent down to the last memory unit in the chain. The last memory unit returns its memory contents corresponding to the reference address. Subsequently, each memory unit in the memory unit subtracts its contents corresponding to the reference address from the data recovery from the previous memory unit in the direction from the last memory unit, as the recovery response is returned along the chain. With respect to the above example, if memory unit 710-2, which should be able to provide contents B, has bad data, the response returned to path controller 705 is D (from memory unit 710-4)+C (from memory unit 710-3)+(A+B+C+D) (from ECC memory unit 712)+A (from memory unit 710-1)=B, where sums are performed by an XOR operation. For an XOR operation, A+A=0, C+C=0, and D+D=0.

An architecture, similar to that of FIG. 7, can conduct a path error recovery operation for a path error, such as a fault in a link in a memory chain. Memory units in the chain detect path errors using a retry process with respect to a request to a memory unit in the chain. The retry process includes maintaining a count of the number of retries and determining if a retry count is exceeded. Alternatively, detection of a path error and/or the need to retry can be based on a determination of a time-out for a response to a request. In an embodiment, all requests and responses can include cyclic redundancy check (CRC) coverage, both for inbound and outbound activity. In addition, messages and other requests can be sent as packets along the path of the memory chain. If a unit receives a packet with bad CRC at an inbound port, it requests a retransmission on the respective outbound port and decrements a retry counter 767-1, 767-2 . . . 767-(N−1), or 767-N within its respective path error logic 766-1, 766-2 . . . 766-(N−1), or 766-N in a memory unit of chain 701, retry counters 767-00 within path error logic 766-00 in path controller 705, and/or retry counters 767-01 within path error logic 766-01 of ECC unit 712, associated with these ports. Each unit can have a retry counter for each port. A memory unit can have an East port to couple to an inbound link from a direction of the chain and to couple to an outbound link in the opposite direction. The memory unit can also have a West port to couple to an inbound link from that direction of the chain and to couple to an outbound link in the opposite direction.

If the number of retries causes the counter to decrement to zero, the memory unit considers that port as being down. A successful transmission and receipt sets the counter to its original retry count. Alternatively, if a memory unit is expecting a response to a packet sent on an outbound link and one is not received within a time-out period, the memory unit assumes the link or the path is down. A port of a memory unit being down may be taken as the path is down. A link coupled to a port of a memory unit being down may be taken as the port being down.

All packets transmitted are expected to receive responses. The responses allow for link and path flow management in addition to error management. In various embodiments as shown in the architectures in FIGS. 5-7, logic including retry counters and/or time-out counters can be implemented in the components of the respective chains and corresponding controllers for link and path flow management in addition to error detection.

When a path error is detected such that operation retries cannot recover, the detecting memory unit sends an error message to the path controller. That error message will be sent through the still functioning port. In most cases, this may not be necessary as the memory unit upstream of the fault will be able to signal the error to the path controller, as that memory unit will time-out and then signal that fault. With correct and reliable link communication not established, the logic in the upstream memory unit can determine that the chain does not function past that point and configure itself as the end of that local serial chain. At the same time, the memory unit puts itself into a mode such that when recovery requests are received from the functioning port, the memory unit will return data from its memory at the referenced address rather than saving the data to await a returning read recovery data item, when performing error recovery. The data is not saved to await a returning read recovery data item, because, as of the path failure, that memory unit is now at the end of the broken chain.

When reading data from memory units located before the path break, the path controller sends requests for data as it would for normal operations. Requests to memory units on the other side of the break are sent through the other port of these memory units. The path controller can be constructed to respond to the possibility that rather than a path break, the memory unit past the break has failed.

The path recovery process can be disjoint from a data error recovery discussed above. It is then possible to support read recovery from a memory unit that subsequently has data errors, even though the data error is a second failure within the set of memory units of the memory chain. When writing, and if desired, a memory unit upstream of the failure can return its difference data back to the path controller, which then sends the difference data to the ECC unit using the other port. For memory units that are downstream of the failure, the path controller can send the write operation down the other port. The memory unit to which data is being written sends its difference update to the ECC unit as for normal operation.

In order to perform read recovery operations in the presence of a fault along a path, the path controller first sends the memory unit just on the other side of the broken link a command to configure that memory unit such that the memory unit internally sets itself as the end of its path in case the other memory unit has not detected that the local link is considered down. The path controller then sends a read recovery request down each port. The path controller performs an XOR operation on the data received in response to recovery request, whose result is the data being recovered, in various embodiments.

For a total memory unit failure, the path controller is informed of a path failure with respect to a request using the sequence for a path failure discussed above. The path controller sends the same request through the other port, that is, in the other direction of the memory chain. In response to the request being sent in the other direction, an error message returns that points to a path failure of the next link past the link indicated as having the first failure. The logic of the path controller uses this additional error information such that the memory unit between the two links, identified as failing, is taken to be the error source. The last memory unit in the chain of the second transmission of the request also places itself in a state such that it functions as the last memory unit in the failing chain, so that it returns its recovery data when requested without a logic operation, such as an XOR operation.

For a reading operation, the path controller sends recovery requests through each port, that is, in both directions in the memory chain. The memory units functioning in each sub-chain, formed by the ECC unit configured centrally in the memory chain return recovered data items after performing XOR operations on received data items and its corresponding data, in various embodiments. The path controller performs an XOR operation on the two data responses received, which results in the recovered read data, in various embodiments.

For a writing operation, the path controller first performs a read recovery as conducted for a reading operation. The path controller then calculates a difference between the data being written and the recovered read data and sends that difference as an update request to the ECC unit, using the direction that still has access from the path controller to the ECC unit. Reads to a failed memory unit are executed as read recovery operations. Writes to a failed memory unit are executed as read recovery-difference (in the path controller)-ECC update sequences.

Depending on the details of a particular implementation, if the ECC Memory unit fails, different actions can be taken. The path controller can send configuration functions to each memory unit disabling ECC update. Alternatively, the memory chain can be designed such that ECC updates get to the end of that portion of the chain and simply 'fall off the end' of the chain. For this case, the path logic handles hang-up/time-out differently.

Figure 10:
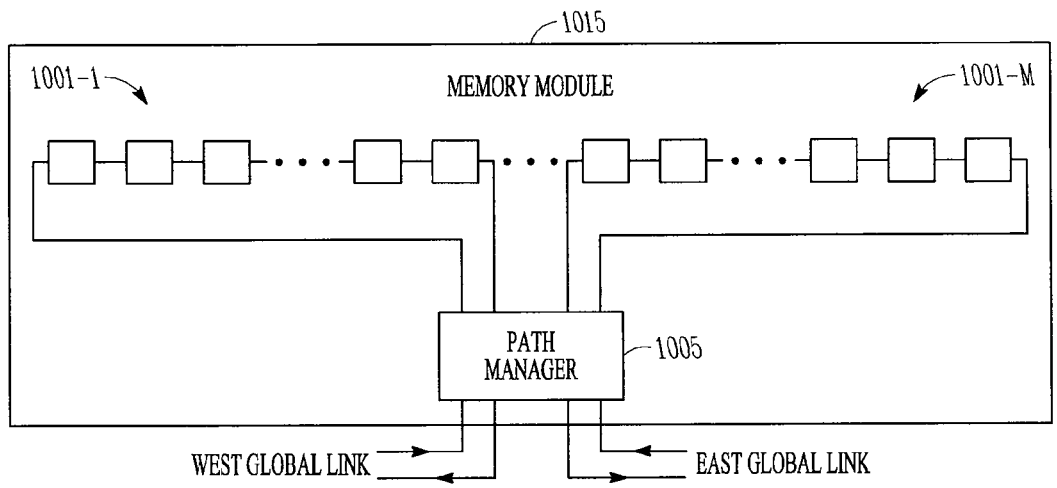
FIG. 10 shows a block diagram of an embodiment of a memory module supporting the capability to recover from the failure of memory chains of serially configured memory units.

FIG. 10 shows a block diagram of an embodiment of a memory module 1015 that can be used to implement chains of such modules. The modules have the capability of supporting recovery from the failure of memory chains 1001-1 . . . 1001-M of serially configured memory units. Memory chains 1001-1 . . . 1001-M can be disposed on memory module 1015. Each of the memory chains 1001-1 . . . 1001-M can be configured similar to the architectures shown in FIGS. 4-7 with the path controller of these architectures incorporated in a path manager 1005. Path manager 1005 can be disposed on memory module 1015. Path manager 1005 can operate to provide error recovery capability for memory module 1015 in a manner similar to the error recovery available for a single memory chain. Path Manager 1005 can include logic circuitry to manage data flow similar to that of FIG. 8. Rather than passing on local read and write commands within a memory unit, commands are sent into a complete chain of memory units.

FIG. 10 shows a global path with a West global link and an East global link. A second global chained path, with its own West global link and an East global link, can be configured through the path manager 1005. Also, rather than implementing the local looped-chain paths shown, 2×M independent single ended chains could be structured in which the ECC memory unit can be absent from each chain. For M=2 local looped-chain paths, four independent chains can be structured.

Figure 11:
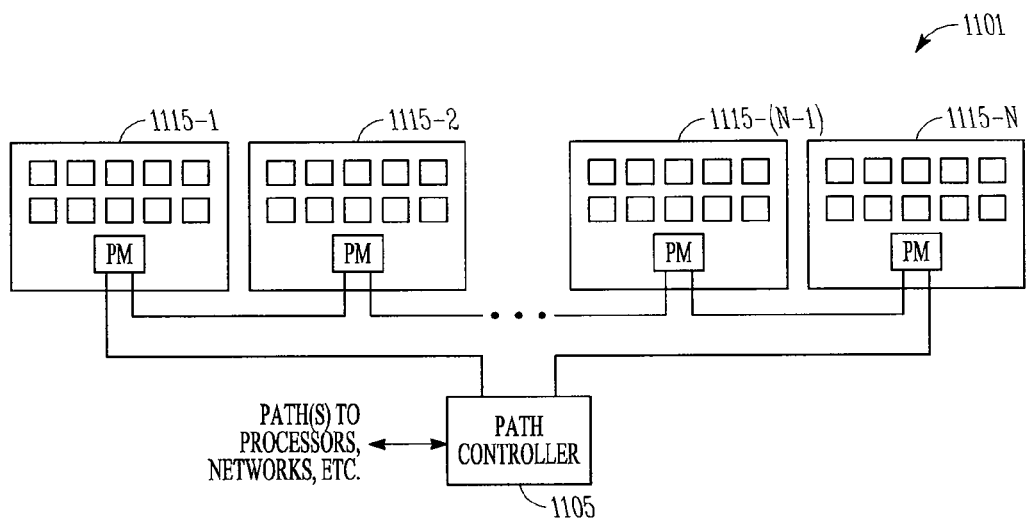
FIG. 11 shows a block diagram of an embodiment of a chain of memory modules that implement the capability to recover from module failure.

FIG. 11 shows a block diagram of an embodiment of a chain 1101 of memory modules 1115-1, 1115-2 . . . 1115-(N−1), 1115-N that implement the capability to recover from module failure. Chain 1101 is coupled to path controller 1105. Path controller 1105 can provide paths to processors, networks, and other apparatus. An ECC memory module can be included in chain 1101 of modules. The ECC module can be constructed similar to or identical to the other modules in chain 1101. ECC module can be disposed in chain 1101 in a similar manner as the ECC units were configured in the memory chains of FIGS. 4-7.

Module chain 1101 can be single-ended in which path controller 1105 is coupled to only one end of module chain 1101, which can provide error recovery from most any data, memory unit, or local-path failure by storing recovery information in the ECC module. If access is made to both ends of module chain 1101 and the ECC module is placed into the middle of chain 1101, then the total bandwidth to the set of modules can be doubled from that available with the ECC module situated as an end module for one way flow of requests and responses. In addition, with the ECC module centrally located in chain 1101, a module or module path can totally fail with the dual access of the architecture of FIG. 11 enabling recovery. Error recovery, implemented in a manner similar to that for a memory chain with a centrally disposed ECC memory unit, can be performed by the path controller 1105, with path managers on each memory modules 1115-1, 1115-2 . . . 1115-(N−1), 1115-N performing the logic functions for correction using passing of data along a path.

Figure 12:
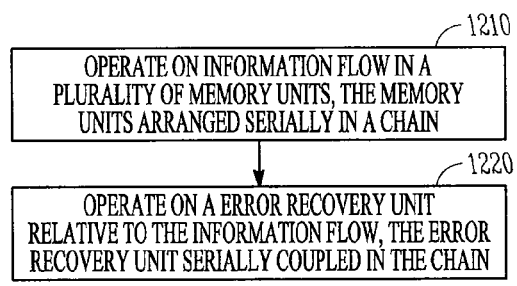
FIG. 12 illustrates features of an embodiment of a method of using a chain-based memory system.

FIG. 12 illustrates features of an embodiment for a method of using a chain-based memory system. At 1210, operations are applied to data flow in a plurality of memory units, where the memory units are configured serially in a chain. Each of the memory units includes two or more access channels configured to allow access to their respective memory unit from two directions in the chain. At 1220, operations are applied to an error check and correcting unit relative to the data flow, where the error check and correcting unit is serially coupled in the chain. A memory unit structured similar the memory units in the chain can be used as the error check and correcting unit. The error check and correcting unit includes two or more access channels, where the access channels are configured to allow access to the error check and correcting unit from two directions in the chain. Memory requests to a memory unit in the chain can be generated from a source in either direction in the chain.

In a chain-based memory system, a chain of serially configured memory units can operate to recover from an unrecoverable read error under operations performed in conjunction with a controller. The controller can be situated with each of the two ends of the chain coupled to different ports of the controller. The chain can be configured with an error check and correcting unit centrally located in the chain forming two serial sections. The recovery procedure for the data requested in a selected memory unit, the selected memory unit being in one serial section of the chain, can include determining that the request for data at an address in the selected memory unit resulted in an unrecoverable read error within the selected memory unit.

A recovery request can be sent from the controller along the chain. In response to the recovery request, data is received at the controller. The appropriately received data is data at the address within the error check and correcting unit minus data at the address from each memory unit in the serial section containing the selected memory unit, except for data from the selected memory unit. After the recovery request is sent from the selected memory, data can also be received at the controller from each memory unit in the other serial section of the chain, where the data from these memory units is also at the address in the data request. Using the data received at the controller from both sections of the chain, the data, at the address in the selected memory unit that resulted in the unrecoverable read error, is determined. Using the data received at the controller from both sections of the chain can include summing the data received at the controller from the other section from the data received at the controller from the section containing the selected memory unit. The summing operation can include using an exclusive-OR operation.

In a chain-based memory system, a chain of serially configured memory units can operate to recover from a path error in the chain under operations performed in conjunction with a controller. The controller can be situated with each of the two ends of the chain coupled to different ports of the controller. The chain can be configured with an error check and correcting unit centrally located in the chain forming two serial sections. The path error check and correcting process can include determining at a memory unit in the chain that a path error has occurred.

In various embodiments, the controller receives an error status message corresponding to the path error at the memory unit. The controller sends a recovery request to the two serial sections of the chains. For chain break failures, the controller receives two replies in response to sending the recovery request. One reply is from one of the two serial sections and the other reply is from the other one of the two serial sections. The controller manipulates the two replies to recover data that was originally requested but was not provided due to the path error.

In a chain-based memory system, a chain of serially configured memory units can operate to recover from a fault of a memory unit in the chain under operations performed in conjunction with a controller. The controller can be situated with each of the two ends of the chain coupled to different ports of the controller. The chain can be configured with an error check and correcting unit centrally located in the chain forming two serial sections. The recovery of data, in which a memory unit has faulted, can include determining at a memory unit in the chain that a path error has occurred, where the memory unit is disposed on one side of the failed memory unit in the chain. At another memory unit in the chain, it is determined that another path error has occurred, where the second memory unit disposed on the side of the failed memory unit in the chain that is opposite to the side in which the first memory unit is disposed.

In various embodiments, the controller receives a first error status message corresponding to the path error determined at the first memory unit and a second error status message corresponding to the path error determined at the second memory unit. The controller sends a recovery request from the controller into the two ends of chain. At each port of the controller, a respective response corresponding to recovered data is received from functioning memory units of the chain. The controller manipulates the two responses to recover the data of the failed memory unit.

In various embodiments, structures include memory units configured serially in a memory chain such that each memory unit is configured to allow access to the memory section from two directions of data flow for a read operation and to allow access to the memory section from two directions of data flow for a write operation. Each memory unit can include a memory section and an interface section. The interface section can be configured to control data flow on access channels of the memory unit. Memory units can be structured as a stack of memory devices coupled vertically to a logic chip. The logic chip can operate as the interface section of the memory unit. The memory chain can include a memory unit configured as an ECC unit. The ECC unit may be situated at the end of the memory or in the middle of the memory chain, as well as at other locations. Conventional techniques for forming individual memory chips and for coupling components of memory chains, modules, and/or module chains may be implemented in forming the apparatus described herein.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A memory unit comprising:
   a memory section having a plurality of memory devices arranged as a vertical stack of individual memory chips; and
   an interface section coupled to the memory section, the interface section structured to couple into a chain exterior to the memory unit, and further structured to allow access to the memory section in response to a request to access the memory section received from either of two directions in the chain.

2. The memory unit of claim 1, wherein the interface section is a logic chip having logic circuitry to control the access to the memory section in response to the request.

3. The memory unit of claim 2, wherein the logic chip is disposed in the vertical stack.

4. The memory unit of claim 2, wherein the logic circuitry is arranged to process requests from the two different directions and to pass on from the logic chip received requests not directed to the memory unit.

5. The memory unit of claim 2, wherein each individual memory chip is arranged as a vertical level having a number of partitions of memory on a horizontal level for each vertical level such that each partition of memory on one vertical level forms a vertical slice with a respective selected partition from each of the other vertical levels, each vertical slice being a vault of memory.

6. The memory unit of claim 5, wherein the logic chip includes a number of vault controllers to transfer data to and from the vaults.

7. The memory unit of claim 5, wherein each partition of memory includes multiple memory banks.

8. The memory unit of claim 2, wherein the logic chip includes path error logic structured to determine a path error in information flow when the memory unit is coupled in the chain.

9. The memory unit of claim 8, wherein the path error logic includes a retry counter configured to count a non-zero number of retransmissions of information limited to a selected number of retransmissions in response to determinations that previous corresponding transmissions of the information were in error.

10. The memory unit of claim 8, wherein the logic chip includes logic to reconfigure the memory unit from being an inner memory unit within the chain to being an end memory unit of the chain in response to a command from a controller or automatically as a result of a path error.

11. An apparatus comprising:
    a plurality of memory units, the memory units configured serially in a chain, each memory unit including:
      a memory section having a plurality of memory devices arranged as vertical stack of individual memory chips; and
      a logic chip coupled to the memory section, the logic chip structured to couple into the chain and further structured to allow access to the memory section in response to a request to access the memory section received from either of two directions in the chain; and
    an error check and correcting (ECC) unit serially coupled in the chain, the ECC unit being an individual unit in the chain separate from the memory units, the chain being separate from and connectable to a controller, the controller operable to control flow of data along the chain.

12. The apparatus of claim 11, wherein within each memory unit, the logic chip is disposed in the vertical stack.

13. The apparatus of claim 11, the plurality of memory units are configured to perform local path recovery to recover from a path error from one memory unit to a memory unit disposed next in the chain.

14. The apparatus of claim 11, wherein the apparatus includes a path controller coupled to the chain, the path controller coupled to the ECC unit disposed last in the chain and coupled to a memory unit disposed at another location in the chain.

15. The apparatus of claim 11, wherein the memory units and the ECC unit are configured in the chain such that the ECC unit is substantially centrally disposed in the chain.

16. The apparatus of claim 11, wherein the apparatus includes
    a memory module on which the chain of memory units is disposed;
    a second chain of memory units configured serially in the second chain; and
    a path manager, the path manager arranged to control information flow to the memory units of the first memory chain and the second memory chain.

17. A method comprising:
    operating on information flow in a plurality of memory units, the memory units configured serially in a chain, each memory unit having a plurality of memory devices arranged as a vertical stack of individual memory chips and having a logic chip coupled to the vertical stack, the logic chip structured to couple into the chain and further structured to allow access to the respective memory unit in response to a request to access the respective memory unit received from either of two directions in the chain; and
    performing error recovery in the chain following a determination of an error in the chain.

18. The method of claim 17, wherein the method includes operating an error check and correcting (ECC) unit relative to the information flow, the ECC unit being an individual unit in the chain separate from the memory units, the chain being separate from and connectable to a controller, the controller operable to control flow of data along the chain.

19. The method of claim 18, wherein performing the error recovery includes performing the error recovery in conjunction with the controller including:
    determining that a request for data at an address in a selected memory unit resulted in an unrecoverable read error;
    acquiring data from the address within the ECC unit and data at the address from each memory unit in the chain except for the selected memory unit; and
    determining, using the acquired data, the data at the address in the selected memory unit.

20. The method of claim 19, wherein determining, using the acquired data, the data at the address in the selected memory unit includes at each memory unit in the chain, except the selected memory unit, subtracting local data at the address in the respective memory unit from data input to the respective memory unit, in response to a recovery command to the chain, and sending its subtraction result to a next memory unit in the chain towards the controller.

21. The method of claim 20, wherein subtracting local data in each memory unit includes performing an exclusive-OR operation in the logic chip of each memory unit.

22. The method of claim 18, wherein performing the error recovery includes operating on the chain as two virtual chains.

23. The method of claim 18, wherein the ECC unit is disposed at a location of the chain other than at an end of the chain.

24. The method of claim 23, wherein the ECC unit is disposed at a center of the chain.

25. The method of claim 18, wherein the method comprises performing configuration functions in each of the memory units to disable ECC update in response to a determination that the ECC unit failed.

26. The method of claim 17, wherein the logic chip is disposed in the vertical stack.

* * * * *